United States Patent [19]
Kulakowski et al.

[11] Patent Number: 5,956,198
[45] Date of Patent: Sep. 21, 1999

[54] TAPE REWINDER IN TAPE STORAGE AND RETRIEVAL LIBRARY

[75] Inventors: John Edward Kulakowski; Rodney Jerome Means, both of Tucson, Ariz.

[73] Assignee: International Business Machines Corporation, Armonk, N.Y.

[21] Appl. No.: 08/845,492

[22] Filed: Apr. 25, 1997

[51] Int. Cl.⁶ .................................................. G11B 15/18
[52] U.S. Cl. .............................................. 360/71; 360/69
[58] Field of Search .................................. 360/69, 71, 92; 414/932; 364/478.02; 352/123, 124; 242/337

[56] References Cited

U.S. PATENT DOCUMENTS

| | | | |
|---|---|---|---|
| 3,667,624 | 6/1972 | Ogura et al. | 214/8.5 A |
| 3,990,789 | 11/1976 | Nishino et al. | 352/123 |
| 4,928,245 | 5/1990 | Moy et al. | 360/71 X |
| 4,984,897 | 1/1991 | Baranski | 360/92 |
| 5,128,912 | 7/1992 | Hug et al. | 369/38 |
| 5,654,839 | 8/1997 | Tanaka et al. | 360/69 X |

OTHER PUBLICATIONS

Patent Abstracts of Japan, vol. 18, No. 28, Library Device with Rewind Device, Tanaka, Oct. 8, 1993.

*Primary Examiner*—Andrew L. Sniezek
*Attorney, Agent, or Firm*—John H. Holcombe; Robert M. Sullivan

[57] ABSTRACT

A rewind tape drive is disclosed for a tape library for rewinding a tape upon a read/write tape drive of the library completing reading and/or writing a tape. In some instances, the tape may be positioned close to the beginning of tape at the completion of reading and/or writing. Thus, the disclosed invention may additionally, upon completion of reading and/or writing a tape, determine whether the time required for the tape drive to rewind the tape exceeds a predetermined time, and transport the tape to the rewind unit only upon exceeding the predetermined time. The predetermined time may comprise the time required for unloading the tape from the read/write tape drive to an accessor, the time required for the accessor to transport the tape to the rewind unit, and the time required to load the transported tape into the rewind unit. A predetermined algorithm may be employed to compare the time required for the tape drive to rewind a tape to the time required for the rewind unit to rewind the tape plus the unload/transport/load time.

39 Claims, 3 Drawing Sheets

TAPE REWINDER IN TAPE STORAGE AND RETRIEVAL LIBRARY

TECHNICAL FIELD

This invention relates to storage and retrieval libraries, and, more particularly, to rewinding tape media in storage and retrieval libraries.

BACKGROUND OF THE INVENTION

The speed in which tape media storage and retrieval libraries access new tape cassettes is critical in an interactive environment in order to provide rapid response to requests for data. Tapes must be rewound upon the completion of reading and/or writing data so that the tape cassette, upon being stored, will be in the appropriate state for immediate use upon being accessed. Tape libraries are handicapped because of the low rewind tape transport speed.

The problem is that tape cassettes contain very long lengths of tape in order to achieve the maximum capacity. Thus, the rewind length from the last position of the tape at the completion of reading and/or writing back to the starting position, typically called "BOT" for "beginning of tape", is likely to be very long. In two reel cassettes, the BOT is typically at one end of the tape, but may also be at the midpoint to reduce the initial search time.

Tape library media are optimized for lowest cost and greatest capacity in the smallest form factor, for which tape cassettes and cartridges comprises the best design choice. Many tape cassettes and cartridges use a relatively wide tape for high capacity, e.g., half inch tape, and the associated library read/write tape drives have only mechanical tape guides, no air bearings. Thus, the rewind must be accomplished at a low speed in order to avoid damaging the tape edge. Further, in order to keep the library cost low, library tape drives may not have a tape lifter or head retractor so that the tape must run against the head during rewind, requiring that the rewind be accomplished at a very low speed to prevent excessive head wear. Lastly, space within the library for the read/write drive may be limited, and the read/write drive motor may be of limited size and not have sufficient torque to rewind at high speed.

Although the problem is primarily related to tape cassettes, one type of single reel tape cartridge utilizes a single loop of tape, where the tape is fed from the inner radius of the reel and the tape is recovered on the outer radius of the reel. Thus, the rate at which the tape can be rewound is limited additionally by the heat generated by the friction of the tape layers slipping by one another.

All of the tape cassettes and cartridges are optimized for low cost, such as by having low cost bearings, so that the cassette may be the limiting factor for rewind speed.

As the result, tape libraries often add additional read/write drives in order to improve the average response time. This is a costly solution since the read/write drive, particularly the tape head therein, is one of the most expensive components of the library.

SUMMARY OF THE INVENTION

Disclosed is a rewind tape drive for a tape library for rewinding a tape upon a read/write tape drive of the library completing reading and/or writing the tape. In some instances, the tape may be positioned close to the beginning of tape at the completion of reading and/or writing. Thus, the disclosed invention may additionally, upon completion of reading and/or writing a tape, determine whether the time required for the tape drive to rewind the tape exceeds a predetermined time, and transport the tape to the rewind unit only upon exceeding the predetermined time. The predetermined time may comprise the time required for unloading the tape from the read/write tape drive to an accessor, the time required for the accessor to transport the tape to the rewind unit, and the time required to load the transported tape into the rewind unit, and the time required to rewind the tape on the rewind drive.

For a fuller understanding of the present invention, reference should be made to the following detailed description taken in conjunction with the accompanying drawings.

DETAILED DESCRIPTION OF THE INVENTION

Figure 1:
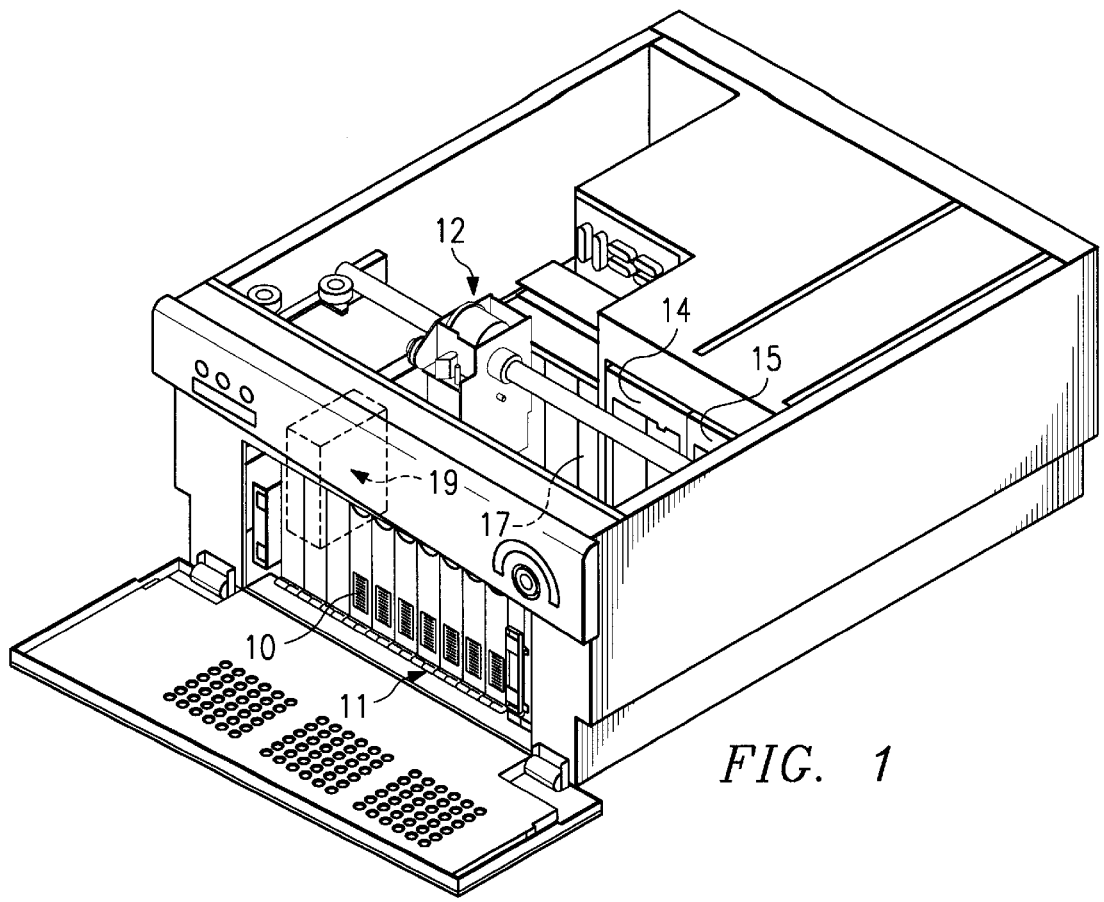
FIG. 1 is a perspective representation of a tape library of the present invention.

FIG. 1 illustrates an embodiment of a library for storage and retrieval of a plurality of tape cassettes 10 stored in cells 11. The tape cassettes 10 are accessed by a an accessor mechanism 12 for transport between the cells 11, a read/write tape drive 14 and a rewind only tape drive 15. Additional cells 17 may store additional cartridges for retrieval by the accessor mechanism 12. A bar code reader 19 identifies a cassette by reading the bar code thereon as accessor 12 moves the cassette to the bar code reader. Many types and styles of tape libraries are in use today, and any of the libraries capable of storing and retrieving tape cassettes may be used for the present invention by adding the rewind only tape drive 15 thereto.

Figure 2A:
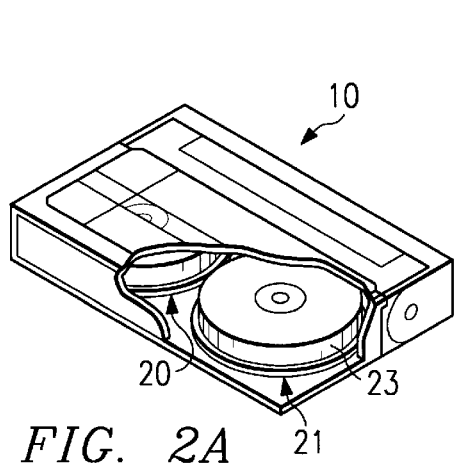
FIGS. 2A and 2B are perspective representations of tape cassettes which may be used in the tape library of FIG. 1.
Figure 2B:
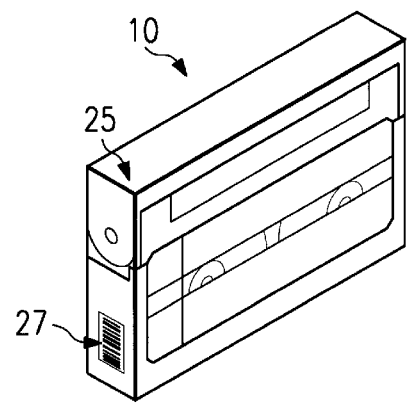

An example of a typical tape cassette 10 is illustrated in FIGS. 2A and 2B. The typical cassette has two reels 20 and 21 on which is wound a tape 23. A cover 25 protects the tape while the cassette is being stored and transported, and the read/write tape drive 14 of FIG. 1 opens the cover 25 during loading to gain access to the tape for reading and/or writing thereon.

A bar code 27 may be provided on an edge of the cassette for identification of the cassette by bar code reader 19 of FIG. 1.

Referring to FIGS. 1, 2A and 2B, as discussed above, the typical tape cassette is designed for the lowest cost and greatest capacity in the smallest from factor. Thus, the typical tape cassette 10 contains a very long length of tape 23. When the tape cassette 10 is accessed and transported to a read/write tape drive 14, the tape 23 is positioned at the "beginning of tape", or BOT. BOT is the location on the tape where the "volume serial number" (VOLSER) for the cassette is recorded, along with other control information for this volume. This data is used to verify the correct tape is being read, and to determine the block size and blocking factor used for this volume. BOT may be located at one end of the tape so that the tape is wound primarily on one of the reels of the cassette for storage. Alternatively, the BOT may be located at a midpoint of the tape so that the seek distance to a desired location is likely to be shorter.

The typical read/write tape drive control will operate the tape drive 14 to reel the tape 23 while searching for the desired data to read or the desired location at which to begin writing. Upon locating the desired data or location, the tape drive 14 will conduct the read and/or write operation. Upon completion of reading and/or writing, the tape 23 will most likely be displaced a considerable distance from the BOT. Since the tape cassette must be stored with the tape at the BOT, as discussed above, the tape must be rewound from it's position at the completion of reading and/or writing to the BOT. A rewind command from a library manager would normally operate the read/write tape drive control to rewind the tape to BOT.

The typical tape drive 14 has only mechanical tape guides, so that any rewind by the tape drive must be accomplished at a low speed in order to avoid damaging the tape edge. Further, the typical library tape drive does not have a tape lifter or head retractor so that the tape must run against the head during rewind, requiring that the rewind be accomplished at a very low speed to prevent excessive head wear. Lastly, the read/write tape drive motor may be of limited size and not have sufficient torque to rewind at high speed.

Therefore, to require a read/write tape drive 14 to rewind the cassette to the BOT occupies the tape drive 14 for a considerable length of time, which time may be better utilized to provide a rapid response to the next request to read and/or write data to another cassette.

The solution to the need to reduce the amount of time a cassette resides on a read/write tape drive 14 in the library is to provide tape drive 15 which is a rewind tape drive used only for rewinding tape. If the rewind drive 15 is to rewind the tape, no rewind command is issued by a library manager to the control for read/write tape drive 14. Instead, an unload command would be issued by the library manager. The library manager is a program that may be located in a host, as will be explained.

Figure 3:
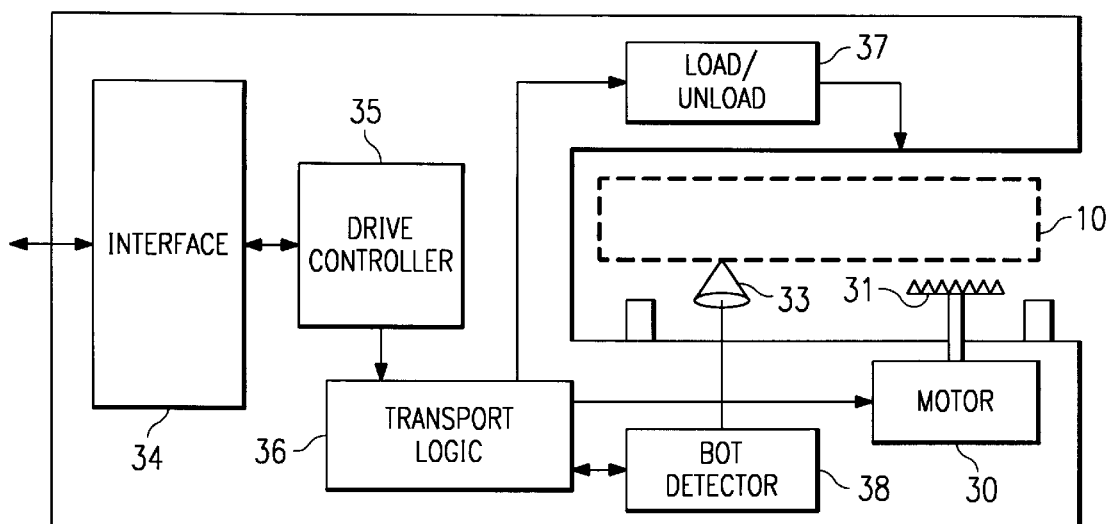
FIG. 3 is a block diagram of a rewind tape drive and control system of the present invention used in the tape library of FIG. 1.

Rewind tape drive 15 and the associated control are illustrated in block diagram form in FIG. 3. Rewind tape drive 15 is similar to read/write tape drive 14, but comprises only those components necessary to rewind the cassette to the BOT. Most importantly, the rewind tape drive 15 will exclude the expensive read/write head and the read/write electronics of the read/write drive. By excluding many of the read/write tape drive components, rewind drive 15 may be able to perform the rewind operation in less time than the read/write tape drive 14, as will be explained.

The rewind tape drive 15 comprises a reel motor 30 which operates reel drive 31. The motor 30 and reel drive 31 may be identical to the motor and reel drive of the read/write tape drive 14. An index sensor 33, also may be identical to the index sensor of read/write tape drive 14, is employed to sense the BOT index mark on the tape. The index sensor 33 may be an optical sensor to detect an optical BOT index mark on the tape, which is typically used when the BOT is at one end of the tape. Alternatively, the BOT may simply be a change of material at the end of tape, e.g., a tape leader without recordable coating. In the instance where the BOT is an absence of a recordable coating, the index sensor 33 may comprise a magnetic sensor which senses the absence of magnetic recordable material. Still alternatively, the BOT may comprise a gross recorded pattern on the tape. In the case of a recorded pattern, index sensor 33 may comprise a read head with limited capability and of low cost for detecting the pattern.

An interface to the library 34 may comprise a standard interface, such as SCSI, and is substantially the same as that of the read/write tape drive 14, although there is no need for the read/write portion of the interface. Thus, the interface 34 may be a simplified version. A drive controller 35 may comprise a microprocessor which is substantially the same as the microprocessor of read/write tape drive 14. Alternatively, a simplified controller may be employed, since no search or read/write operations are conducted.

The drive controller 35 provides commands to transport control logic 36, which operates load/unload motor 37 and reel motor 30. Upon accessor 12 of FIG. 1 delivering a cassette to be rewound, transport control logic 36 operates load/unload motor 37 to load the cassette 10 in the drive, thereby engaging reel drive 31. Drive controller 35 may then command transport control logic 36 to operate the reel motor 30 to rewind the tape.

In the instance where the BOT is at one end of the tape, only one reel motor 30 and reel drive 31 is provided, and the other reel is supported by an idle spindle, and reel motor 30 is operated to drive the reel drive 31 in only one direction to rewind the tape.

Alternatively, the library may utilize cassettes having the BOT at the center of the tape. In that case, two reel motors 30 and reel drives 31 are provided, one for each reel of the cassette. The library will provide drive controller 35 with an indication of the position of the tape at the completion of reading and/or writing, or an indication of the direction the tape is to be rewound in order to reach the center BOT. Drive controller 35 commands transport control logic 36 to operate the one of the reel motors that will move the tape in the direction to rewind the tape to the BOT.

BOT detector 38 responds to the signals provided by the index sensor 33, identifying the BOT and signalling transport control logic 36 that the BOT has been reached. Transport control logic 36 responds to the BOT signal from BOT detector 38 by stopping reel motor 30.

Referring to FIG. 3 and additionally to FIG. 1, drive controller 35 then signals the library manager over interface 34 that the tape of the cassette 10 has been rewound. The library manager will then cause accessor 12 to access rewind tape drive 15. Upon receiving an indication that the accessor 12 has arrived, drive controller 35 commands transport control logic 36 to operate load/unload motor 37 to unload the cassette 10 for access by the accessor 12.

The library manager will then operate the accessor to return the rewound tape to its storage cell 11.

In a library having dual grippers on accessor 12, the library may take advantage of rewind drive 15 by responding to a command to access a cassette 10 in one of the grippers, transporting the cassette to the read/write tape drive 14, unloading the cassette to be rewound currently in drive 14 into the other one of the grippers, loading the transported cassette into drive 14, and then transporting the cassette to be rewound to rewind tape drive 15. Thus, the new cassette is exchanged for the cassette to be rewound and the new cassette may be read or written immediately.

Figure 4A:
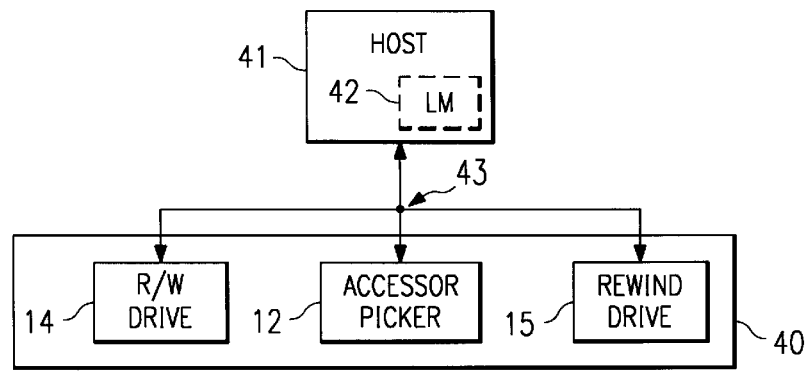
FIGS. 4A, 4B and 4C are block diagrams of alternative library control systems of the present invention.
Figure 4B:
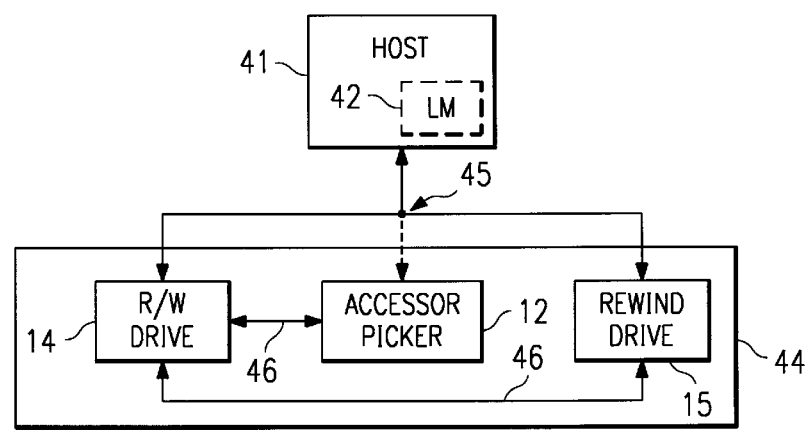
Figure 4C:
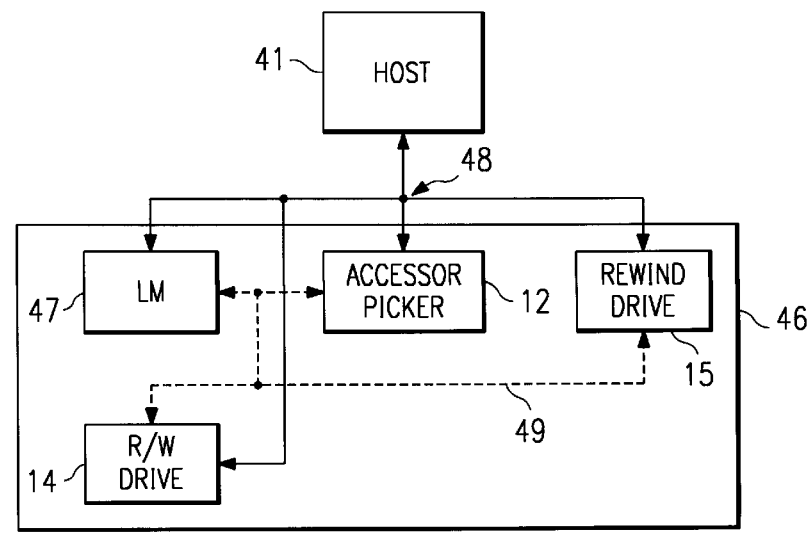

FIGS. 4A, 4B and 4C illustrate alternative embodiments of control systems for the library and rewind tape drive of the present invention.

FIG. 4A illustrates a library 40 having accessor 12, read/write tape drive 14, rewind tape drive 15 and a host processor 41 having a library manager application program 42, all interconnected by means of an interface 43, such as SCSI, as will be explained. Host processor 41 may be physically located remotely from library 40, near library 40, or, in very large libraries, within library 40.

Host 41 comprises a data processing system, for example, a personal computer system and associated operating system of the type that is commonly available, such as Microsoft Windows NT, and library manager 42 comprises a specialized application program for operating the library. Such application programs are within the skill of those ordinarily skilled in the art. The library manager 42 maintains a database or tables in which an inventory of data stored in the library and of the media on which the data is stored. Library manager 42 also may utilize the block size and blocking factor read from a tape to estimate the distance to BOT from the location of a tape at the completion of reading and/or writing, as will be explained.

Host 41 is shown connected to read/write tape drive 14, accessor 12 and rewind drive 15 by means of connection network 43, which may comprise any suitable network or cable connection and interface arrangement. A typical interface 43 is the Small Computer Systems Interface (SCSI). Commands are issued by the host library manager to the read/write drive 14, accessor 12 and rewind drive 15 over the interface and data and sensed information is transmitted to or from the host over the interface, as is well known to those skilled in the art.

FIG. 4B illustrates a library 44 having host 41 and library manager 42 connected to read/write tape drive 14 and rewind tape drive 15 by means of an interface or network 45. The drive controller microprocessor of read/write tape drive 14 is modified to also control the operation of accessor 12 in accordance with commands from the library manager 42 over interface or network 45.

The read/write drive controller may be directly connected to accessor 12 by internal cables 46 or network 45 (dashed line of network 45). Network 45 may comprise any suitable network or cable connection and interface arrangement, such as SCSI. In the event the read/write tape drive 14 uses SCSI 45 to communicate with accessor 12, the read/write drive controller becomes an "initiator" in the SCSI environment, as well as a "target" when host 41 is an "initiator", which will be understood by those of skill in the art.

Read/write drive 14 may then issue a move command to accessor 12 via SCSI 45 or over lines 46 to move a cartridge to the rewind drive. Similarly, read/write drive 14 may send a rewind command to rewind drive 15 via SCSI 45 or over lines 46 to rewind a cartridge.

FIG. 4C illustrates a library 46 having a microprocessor card 47 which includes the library manager program therein. Host 41 issues only the volume or data load commands over a network 48 to the library manager microprocessor card 47, issues commands to the controller of drive 14, and receives and provides the data read from and to be written to the cassette in read/write tape drive 14.

Again, network 48 may comprise any suitable network or cable connection and interface arrangement, such as SCSI. The library manager card 47 would become the "initiator" for commands issued to accessor 12, read/write tape drive 14, rewind drive 15 and for communication from the library manager to the host 41.

In the simplest arrangement, all cassettes will be rewound in rewind tape drive 15. Thus, upon the completion of reading and/or writing by read/write tape drive 14, the library will cause the cassette to be transported by accessor 12 from the read/write tape drive 14 to the rewind tape drive 15 for rewinding. This arrangement is also preferred in order to avoid excessive wear of the read/write head in the instance where the read/write tape drive 14 does not have a tape lifter or a retractable head, so that any rewind by the read/write tape drive would require that the tape be rewound while in contact with the head.

In some instances, at the completion of reading and/or writing, the tape will be relatively close to the BOT. In such instances, it may take longer to unload the cassette from the read/write tape drive 14, transport the cassette to rewind tape drive 15 and load the cassette into rewind tape drive 15, than it would take to rewind the tape to BOT on the read/write tape drive. It may therefore be desirable to rewind the tape at the read/write tape drive in order to reduce the rewind time.

The rewind tape drive, by not having a read/write tape head and associated tape alignment guides, may rewind the tape much faster than the read/write tape drive. Alternatively, the rewind tape drive may be provided with a motor which rewinds the tape at a faster speed.

Figure 5:
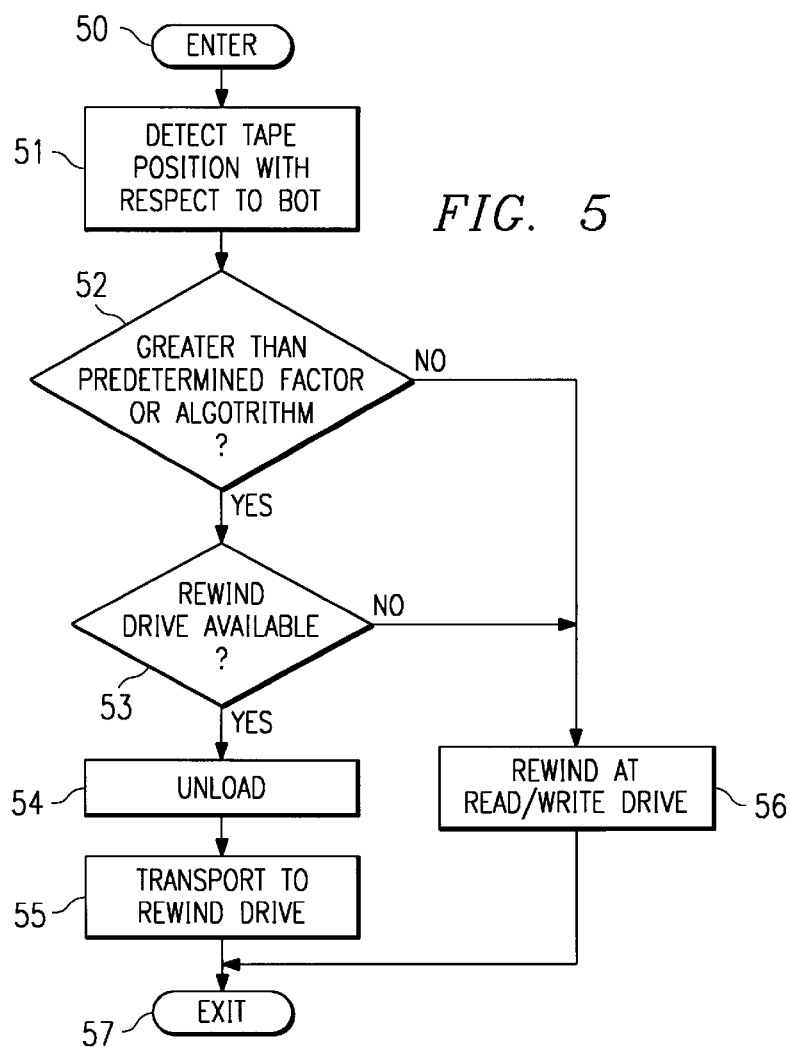
FIG. 5 is a flow diagram of the decision whether to transport a cassette to the rewind tape drive.

FIG. 5 illustrates an example of the logic decision made by the library manager whether to transport the cassette to the rewind tape drive at the conclusion of reading and/or writing in order to not waste time if the tape is close to the BOT.

Upon the completion of reading and/or writing the cassette, the logic is entered at step 50. In step 51, the tape position is detected with respect to the BOT. In the typical read/write tape drive 14, the tape position is continually monitored by a tachometer or other indexing means, often attached to the drive spindle of a drive motor, or, alternatively, attached to an idler or tape guide.

Alternatively, the library manager may utilize the search and read/write information to estimate the position of the tape at the conclusion of reading and/or writing. With a fixed block architecture, the control information at BOT, including block size and blocking factor, provides the factors utilized in making the position estimate. For example, the tape will have been searched to a data block number to begin the reading and/or writing of data, which occurs for a given number of blocks. Thus, the beginning block number and the number of blocks read or written identify the block at the completion of reading and/or writing. The block size and blocking factor are then utilized to estimate the position of the tape at the conclusion of reading and/or writing, as will be understood by those skilled in the art.

In step 52, the detected tape position with respect to BOT is compared to a predetermined factor or algorithm.

The predetermined factor comprises any suitable or desired factor. In one embodiment, the predetermined factor comprises the time for unloading the cassette from the read/write tape drive 14, transporting the cassette to rewind tape drive 15 and loading the cassette into rewind tape drive 15. The predetermined factor of step 52 comprises a conversion of the total time or the desired factor into a factor commensurate with the measurement made in step 51, which may comprise distance.

As an alternative, the predetermined factor may additionally include the time for rewinding the tape in the rewind drive a length determined from testing which, when added to the unload/transport/load time, matches the longest distance that the read/write drive is able to rewind the tape in the time for unload/transport/load time and the rewind drive to rewind the tape. The alternative predetermined factor is best determined by testing of sample read/write and rewind tape drives. As still another alternative, the predetermined factor may comprise an arbitrary factor, selected to be related to, but arbitrarily shorter than, or longer than, the unload/transport/load time.

An example of a predetermined algorithm in step 52 is whether the rewind time on the read/write drive for the identified length of tape is greater than the rewind time on the rewind drive for the identified length of tape plus the unload/transport/load time. An alternative predetermined algorithm is to make the above comparison before rewinding and, if rewinding on the read/write drive, periodically during the read/write drive rewind process. The periodic comparison would be whether the residual rewind time on the read/write drive is now greater than the time to rewind the residual length of tape on the rewind drive plus the unload/transport/load time. Other algorithms may be envisioned by those of skill in the art.

If the detected tape position with respect to BOT is greater than the predetermined factor or algorithm, step 53 determines whether the rewind tape drive is available or busy. If the rewind tape drive is available, step 54 commands the read/write drive and the accessor to cause the cassette in the read/write drive needing to be rewound to be unloaded from the drive to the accessor. Step 55 commands the accessor to transport the cassette to the rewind tape drive, the accessor and rewind drive to load the cassette into the rewind tape drive, and commands the rewind drive to rewind the cassette tape to BOT.

If, in step 52, the detected tape position is equal to or less than the predetermined factor or algorithm, or if, in step 53, the rewind tape drive is determined to be busy, step 56 causes the cassette to be rewound by the read/write tape drive. Step 57 then exits the decision process.

Thus, the tape may be rewound by the read/write drive in those instances where it is desirable to do so, but in the majority of instances the tape will be rewound by a specialized, low cost rewind tape drive, and will conserve the read/write tape drive while substantially increasing the performance of the library by allowing the next requested cassette to be loaded into the read/write drive while the first cassette is being rewound in the rewind drive.

Although two reel cassettes have been the focus of the present description, certain cartridges may also be utilized with the present invention. The certain cartridges are those where one end of the tape is not extracted from the cartridge. One example is the single loop of tape in a single reel cartridge, which tape is transported from the inner radius of the reel to the outer radius of the reel. In such a cartridge, the rewind cannot be conducted at a high speed due to heat buildup from interlayer slip, and the present invention is particularly advantageous by providing a separate rewind drive due to the long time required for a slow speed rewind. Terms "tape" and "cassette" are therefore inclusive of "cartridges" or any suitable term or means for holding a tape which requires rewinding and can be moved for such rewinding.

While the preferred embodiments of the present invention have been illustrated in detail, it should be apparent that modifications and adaptations to those embodiments may occur to one skilled in the art without departing from the scope of the present invention as set forth in the following claims.

We claim:

1. In an automated storage and retrieval tape cassette library having a plurality of storage cells for storing a plurality of tape cassettes, at least one tape drive for reading and/or writing a tape cassette, and an accessor for transporting a tape cassette between said storage cells and said tape drive, a rewinder comprising:

a rewind unit for rewinding a tape cassette; and a library manager for operating said accessor, said library manager responsive to said tape drive completing reading and/or writing a tape cassette, to determine whether a factor related to the time required for said tape drive to rewind said tape cassette exceeds a predetermined factor, and if said factor exceeds said predetermined factor, for operating said accessor to transport said tape cassette from said tape drive to said rewind unit for rewinding said tape cassette.

2. The automated storage and retrieval tape cassette library rewinder of claim 1, wherein:

said library manager additionally determines whether said rewind unit is available.

3. The automated storage and retrieval tape cassette library rewinder of claim 1, wherein:

said library manager predetermined factor comprises the time required for transporting said tape cassette from said tape drive to said rewind unit.

4. The automated storage and retrieval tape cassette library rewinder of claim 1, wherein:

said library manager predetermined factor comprises the time required for unloading said tape cassette from said tape drive to said accessor, the time required for said accessor to transport said tape cassette to said rewind unit, and the time required to load said transported tape cassette into said rewind unit.

5. The automated storage and retrieval tape cassette library rewinder of claim 1, wherein:

said library manager additionally operates said accessor for transporting rewound tape cassette from said rewind unit to said storage cells.

6. The automated storage and retrieval tape cassette library rewinder of claim 1, wherein:

said rewind unit rewinds said tape cassette to the BOT.

7. In an automated storage and retrieval tape cassette library having a plurality of storage cells for storing a plurality of tape cassettes, at least one tape drive for reading and/or writing a tape cassette, and an accessor for transporting a tape cassette between said storage cells and said tape drive, a rewinder comprising:

a rewind unit for rewinding a tape cassette; and a library manager for operating said accessor, said library manager responsive to said tape drive completing reading and/or writing a tape cassette, employs a predetermined algorithm to determine whether the time required for said tape drive to rewind said tape cassette exceeds the time required for said rewind unit to rewind said tape cassette plus the unload/transport/load time, for operating said accessor to transport said tape cassette from said tape drive to said rewind unit for rewinding said tape cassette.

8. The automated storage and retrieval tape cassette library rewinder of claim 7, wherein:

said library manager additionally, upon rewinding said tape cassette in said one tape drive, employs said predetermined algorithm periodically during said tape drive rewind to determine whether the residual rewind time by said one tape drive exceeds the time required for said rewind unit to rewind the residual length of said tape cassette plus the unload/transport/load time and, if so, for operating said accessor to transport said tape cassette from said tape drive to said rewind unit for rewinding said tape cassette.

9. The automated storage and retrieval tape cassette library rewinder of claim 7, wherein:

said library manager additionally determines whether said rewind unit is available.

10. The automated storage and retrieval tape cassette library rewinder of claim 7, wherein:

said library manager additionally operates said accessor for transporting said rewound tape cassette from said rewind unit to said storage cells.

11. The automated storage and retrieval tape cassette library rewinder of claim 7, wherein:

said rewind unit rewinds said tape cassette to the BOT.

12. The automated storage and retrieval tape cassette library rewinder of claim 7:

wherein said library manager issues commands for operating said accessor; and additionally comprising a controller microprocessor in said tape drive responsive to said library manager issued commands for issuing a command to said accessor to transport said tape cassette from said tape drive to said rewind unit, and for issuing a command to said rewind unit to rewind said tape cassette.

13. The automated storage and retrieval tape cassette library rewinder of claim 12:

additionally comprising a SCSI interface connection between said tape drive, said accessor and said rewind unit; and said tape drive initiates said commands via said SCSI interface connection to said accessor and to said rewind unit.

14. The automated storage and retrieval tape cassette library rewinder of claim 12:

additionally comprising direct connections between said tape drive and said accessor, and between said tape drive and said rewind unit; and said tape drive provides said commands over said direct connections to said accessor and to said rewind unit.

15. An automated storage and retrieval tape library, comprising:

a plurality of storage cells for storing a plurality of tapes;

at least one tape drive for reading and/or writing a tape;

an accessor for transporting a tape between said storage cells and said tape drive;

a rewind unit for rewinding tape; and a library manager for operating said accessor, responsive to said tape drive completing reading and/or writing a tape, to determine whether a factor related to the time required for said tape drive to rewind said tape exceeds a predetermined factor, and if said factor exceeds said predetermined factor, for operating said accessor for transporting said tape from said tape drive to said rewind unit for rewinding said tape.

16. The automated storage and retrieval tape library of claim 15, wherein:

said library manager predetermined factor comprises the time required for transporting said tape from said tape drive to said rewind unit.

17. The automated storage and retrieval tape cassette library rewinder of claim 15, wherein:

said library manager additionally determines whether said rewind unit is available.

18. The automated storage and retrieval tape cassette library rewinder of claim 15, wherein:

said library manager is located in a host data processor, connected to said tape drive, said accessor and said rewind unit through a network.

19. The automated storage and retrieval tape cassette library rewinder of claim 15, wherein:

said library manager is located in a microprocessor card, connected to said tape drive, said accessor and said rewind unit through a network.

20. The automated storage and retrieval tape library of claim 15, wherein:

said library manager predetermined factor comprises the time required for transporting said tape from said tape drive to said rewind unit.

21. The automated storage and retrieval tape library of claim 15, wherein:

said library manager predetermined factor comprises the time required for unloading said tape from said tape drive to said accessor, the time required for said accessor to transport said tape to said rewind unit, and the time required to load said transported tape into said rewind unit.

22. The automated storage and retrieval tape library of claim 15, wherein:

said library manager additionally operates said accessor for transporting rewound tapes from said rewind unit to said storage cells.

23. The automated storage and retrieval tape library of claim 15, wherein:

said tapes are rewound to the BOT.

24. The automated storage and retrieval tape cassette library rewinder of claim 15, wherein:

said library manager additionally, upon said completion of reading and/or writing a tape, employs a predetermined algorithm to determine whether the time required for said tape drive to rewind said tape exceeds the time required for said rewind unit to rewind said tape plus the unload/transport/load time and, if so, for operating said accessor to transport said tape from said tape drive to said rewind unit for rewinding said tape.

25. The automated storage and retrieval tape cassette library rewinder of claim 24, wherein:

said library manager additionally, upon rewinding said tape cassette in said one tape drive, employs said predetermined algorithm periodically during said tape drive rewind to determine whether the residual rewind time by said one tape drive exceeds the time required for said rewind unit to rewind the residual length of said tape plus the unload/transport/load time and, if so, for operating said accessor to transport said tape from said tape drive to said rewind unit for rewinding said tape.

26. The automated storage and retrieval tape cassette library rewinder of claim 24, wherein:

said library manager additionally determines whether said rewind unit is available.

27. The automated storage and retrieval tape cassette library rewinder of claim 24, wherein:

said library manager additionally operates said accessor for transporting said rewound tape cassette from said rewind unit to said storage cells.

28. The automated storage and retrieval tape cassette library rewinder of claim 24, wherein:

said rewind unit rewinds said tape cassette to the BOT.

29. A method for rewinding tapes in an automated storage and retrieval library, said library having a plurality of storage cells for storing a plurality of tapes, at least one tape drive for reading and/or writing a tape, a rewind unit for rewinding tape, and an accessor for transporting a tape between said storage cells and said drive and rewind units, said method comprising the steps of:

sensing said tape drive completing reading and/or writing a tape;

determining, in response to said sensing step, whether a factor related to the time required for said tape drive to rewind said tape exceeds a predetermined value;

conducting said transporting and rewinding steps upon said determining step determining said factor exceeds said predetermined value;

operating said tape drive to rewind said tape upon said determining step determining said factor is less than or equal to said predetermined value;

upon said determining step determining said factor is greater than said predetermined value, transporting said tape from said tape drive to said rewind unit; and rewinding said tape in said rewind unit.

30. The method for rewinding tapes of claim 29, wherein:
said determining step predetermined value comprises the time required for transporting said tape from said tape drive to said rewind unit.

31. The method for rewinding tapes of claim 29, wherein:
said determining step predetermined value comprises the time required for unloading said tape from said tape drive to said accessor, the time required for said transporting step to transport said tape to said rewind unit, and the time required to load said transported tape into said rewind unit.

32. The method for rewinding tapes of claim 29, comprising the additional step of:
upon completion of said rewinding step, transporting said rewound tape from said rewind unit to one of said storage cells.

33. The method for rewinding tapes of claim 29, to the BOT, wherein:
said determining step comprises determining whether the time required for said tape drive to rewind said tape from the position at the completion of said reading and/or writing to the BOT exceeds a predetermined value; and
said rewinding step comprises rewinding said tape to the BOT.

34. The method for rewinding tapes of claim 29, wherein:
said determining step additionally comprises determining whether said rewind unit is available.

35. The method for rewinding tapes of claim 29:
wherein said determining step comprises determining in accordance with a predetermined algorithm whether the time required for said tape drive to rewind said tape exceeds the time required for said rewind unit to rewind said tape plus the unload/transport/load time;

wherein said transporting and rewinding steps are conducted upon said determining step determining said tape drive rewind time exceeds said rewind unit rewind time plus the unload/transport/load time; and wherein said operating step comprises operating said tape drive to rewind said tape upon said determining step determining said tape drive rewind time is less than or equal to said rewind unit rewind time plus the unload/transport/load time.

36. The method for rewinding tapes of claim 35, comprising the additional step of:
upon completion of said rewinding step, transporting said rewound tape from said rewind unit to one of said storage cells.

37. The method for rewinding tapes of claim 35, to the BOT, wherein:
said determining step comprises determining whether the time required for said tape drive to rewind said tape from the position at the completion of said reading and/or writing to the BOT exceeds a predetermined value; and
said rewinding step comprises rewinding said tape to the BOT.

38. The method for rewinding tapes of claim 35, wherein:
said determining step additionally comprises determining whether said rewind unit is available.

39. The method for rewinding tapes of claim 35, wherein:
upon said operating step operating said tape drive to rewind said tape, said determining step additionally is conducted periodically, determining whether the residual rewind time by said tape drive exceeds the time required for said rewind unit to rewind the residual length of said tape plus the unload/transport/load time.

* * * * *